Jan. 19, 1965    M. H. WOODMAN    3,166,632
ENCLOSURE FOR ELECTRICAL DEVICE
Filed July 23, 1962
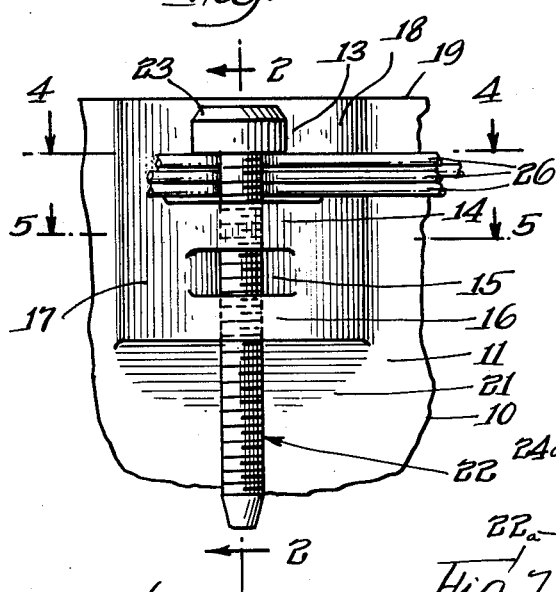
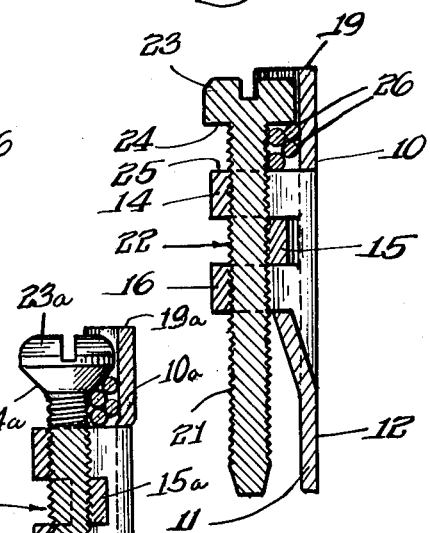
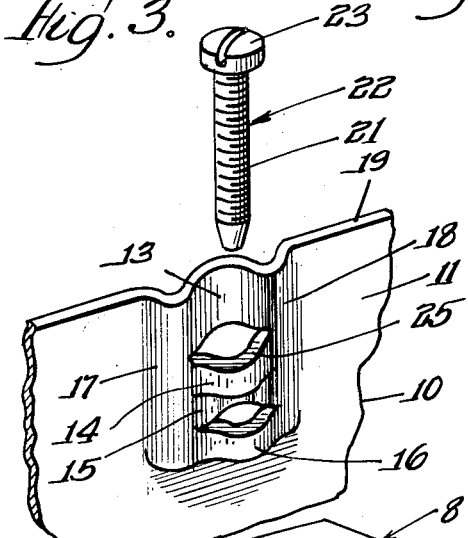
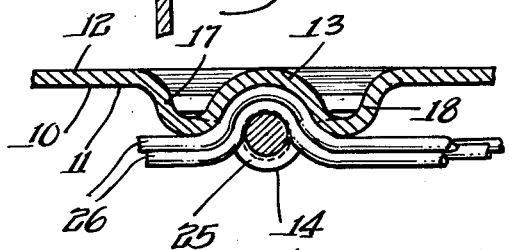
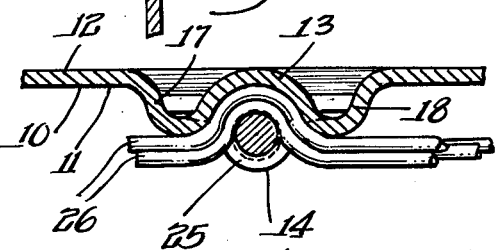
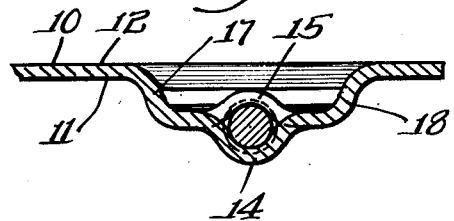
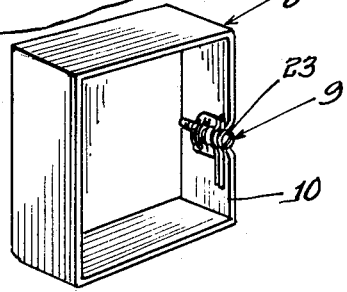
INVENTOR.
Murray H. Woodman
BY
Paul J. Rose
Atty.

United States Patent Office 3,166,632
Patented Jan. 19, 1965

3,166,632
ENCLOSURE FOR ELECTRICAL DEVICE
Murray H. Woodman, Downsview, Ontario, Canada, assignor to Square D Company, Park Ridge, Ill., a corporation of Michigan
Filed July 23, 1962, Ser. No. 211,819
4 Claims. (Cl. 174—51)

This invention relates to a means for mechanically and electrically connecting bonding or ground wires to the metal enclosure or box of an electrical panelboard or load center forming part of an electrical distribution system.

In systems of electrical distribution within buildings, it is desirable that the non-current-carrying parts of electrically energized equipment be connected to ground either directly or through a system of bonding conductors or wires which maintains the non-current-carrying parts at the same potential. In one system of bonding, the enclosures or frames of various electric power utilization devices are electrically connected with the metal enclosure of the panelboard or load center supplying the device. Often this connection is made by a metal conduit for the current-carrying wires. To accomplish the same result in the case of cables installed without metal conduit, such cables include a bonding wire which is connected at one end to a non-current-carrying part of a power utilization device and at the other end to the box of the panelboard or load center. This requires that the panelboard enclosure or box be provided with a means to connect several bonding wires thereto. The connection with the box must not only be a good electrical connection, but must be strong mechanically.

In accordance with this invention, an improved means for mechanically and electrically connecting bonding wires of an electrical distribution system to a box of an electrical panelboard is provided which comprises at least two loops formed in a side portion of the box rearwardly of a front edge thereof and having intermediate portions respectively offset in opposite directions from each other transversely of said side portion. A shank portion of a screw is threadedly received by the loops and an enlarged head portion of the screw is adapted to be positioned rearwardly of the front edge of the box to trap the ends of bonding wires between the side wall of the box and the shank portion of the screw and between the head portion of the screw and a front edge of one of the loops. An additional loop is provided adjacent the front edge of the box to closely embrace the head of the screw.

An object of the invention is to provide a simple, durable, and economical means for electrically connecting bonding wires to a box of an electrical panelboard.

Another object is to provide a readily accessible box bonding means.

A further object is to provide an improved box bonding means adapted to tightly secure a relatively large number of bonding wires of various sizes to the box with one screw.

Yet another object is to provide a box bonding means which is relatively easy to use for securing a number of wires to the box and which maintains the wires closely adjacent a side of the box and away from other terminals and current-conducting parts in the box.

A still further object is to provide an improved box bonding means adapted to tightly secure a relatively large number of wires to the box without shearing the wires.

Another object is to provide a box bonding means which is readily accessible and convenient to use for securing a relatively large number of wires to the box and which will not interfere with a cover for the box.

Other objects will become apparent when the following specification is considered along with the accompanying drawings, in which:

FIGURE 1 is a view of the inner surface of a portion of a side of a box of an electrical panelboard and shows a connecting means constructed in accordance with this invention;

FIGURE 2 is a sectional view taken along line 2—2 of FIGURE 1;

FIGURE 3 is an exploded perspective view of the connecting means of FIGURE 1;

FIGURE 4 is a sectional view taken along line 4—4 of FIGURE 1;

FIGURE 5 is a sectional view taken along line 5—5 of FIGURE 1;

FIGURE 6 is a perspective view of a box embodying the connecting means of this invention; and FIGURE 7 is a view similar to FIGURE 2 and shows a modification of the connecting means of FIGURES 1-6.

In accordance with this invention, a sheet metal box or enclosure 8 (FIGURE 6) which may house an electrical panelboard or load center (not shown) is provided with a connecting means 9 in a side 10 of the box. The side 10 is slit adjacent a front edge to provide a plurality of ribbons parallel to the edge which are formed into loops (FIGURES 1-5) comprising part of the connecting means 9. For illustrative purposes, four such loops 13, 14, 15, and 16 are shown, all of them being offset inwardly of the box 8 from an inner surface 11 of the side 10 of the box by a pair of offsetting portions 17 and 18 contiguous to all four loops so as to lie entirely within the width of the box and not project beyond an outer surface 12 of the box.

The three loops 14, 15, and 16 are spaced in that order from the loop 13 toward the bottom or rear of the box, while the loop 13 is contiguous with a top or front edge 19 of the box. The intermediate portions of all four loops are further offset from the inner ends of the contiguous offsetting portions 17 and 18. Thus, the intermediate portions of the loops 14 and 16 are offset further inwardly, as best shown in FIGURES 2 and 3, while the intermediate portion of the loop 15 is offset back outwardly, as best shown in FIGURES 2 and 5. The intermediate portions of the three loops 14, 15, and 16 are generally arcuate in shape and thereby adapted to threadedly receive a threaded shank portion 21 of a self-tapping screw 22 having an enlarged cylindrical head 23 presenting a shoulder 24 to a top or front edge 25 of the loop 14. Alternatively, the inner surfaces of the loops 14, 15, and 16 may be tapped with a tapping tool, and a screw 22 having ordinary threads inserted. While preferably there are at least three such loops 14, 15, and 16, the inner or rear loop 16 may be omitted if desired.

The intermediate portion of the top or front loop 13 is offset back outwardly from the inner ends of the contiguous offsetting portions 17 and 18 to a greater extent than is the intermediate portion of the loop 15 and is shaped to closely embrace but still clear the head 23 of the screw 22.

To secure the ends of one or more bonding wires 26 to the side 10 of the box, the screw 22 is first positioned to space the shoulder 24 above or in front of the edge 19 of the box. The ends of the bonding wires may then be easily inserted between the shank 21 of the screw and the loop 13, and the screw tightened to secure the ends of the bonding wires 26 between the shoulder 24 of the screw and the edge 25 of the loop 14 and to position the head 23 either flush with or inwardly of the edge 19 of the box where it will not interfere with placement of a cover (not shown) for the box against the edge 19.

In the modification shown in FIGURE 7, the head 23a of the screw 22a is provided with a tapered shoulder 24a which has been found to result in less cutting and abrasion of the bonding wires than the shoulder 24 of the screw 22 of FIGURE 2.

The box 8 will ordinarily be painted, but the paint will be cut away from the loops 14, 15, and 16 by the forming of threads therein, and thus a good electrical connection between the wires and the box is assured.

The kinks formed in the ends of the bonding wires 26 in their assumption of the general curvature of the loop 13 enable them to withstand strong end pulls without becoming loosened from the connecting means 9.

Although the invention has been described as applied to a box for a panelboard or load center, the connecting means of course can be used to fasten a plurality of wires to other structures formed of sheet metal.

I claim:

1. An enclosure for an electrical device, said enclosure comprising an open-front box, an inwardly offset portion in a side of said box, screw shank receiving loop means integrally formed in said inwardly offset portion, and a screw having a threaded shank portion and an enlarged head portion, said shank portion of said screw being threadedly received in said loop means, said loop means being spaced rearwardly of a front edge of said box, and the portion of said box between said loop means and said front edge being disposed radially outwardly of but closely adjacent to said enlarged head portion of said screw, whereby the end portions of a plurality of bonding wires may be received and clamped between said loop means and said enlarged head portion of said screw and between said shank portion of said screw and the portion of said box between said loop means and said front edge.

2. The combination claimed in claim 1, wherein said portion of said box between said screw shank receiving loop means and said front edge extends axially of said screw for a greater distance than the dimension of said enlarged head portion measured axially of said screw.

3. The combination claimed in claim 1, wherein said portion of said box between said screw shank receiving loop means and said front edge is formed into a loop closely embracing said enlarged head portion of said screw along a portion of the periphery thereof.

4. The combination claimed in claim 1, wherein said portion of said box between said screw shank receiving loop means and said front edge extends axially of said screw for a greater distance than the dimension of said enlarged head portion measured axially of said screw and is formed into a loop closely embracing said enlarged head portion of said screw along a portion of the periphery thereof.

References Cited in the file of this patent

UNITED STATES PATENTS

| | | |
|---|---|---|
| 1,979,582 | Stolp | Nov. 6, 1934 |
| 2,130,243 | Mitchell | Sept. 13, 1938 |
| 2,130,399 | Rypinski | Sept. 20, 1938 |
| 2,160,706 | Olson | May 30, 1939 |

FOREIGN PATENTS

| | | |
|---|---|---|
| 640,285 | Germany | Dec. 29, 1936 |
| 148,725 | Great Britain | Aug. 5, 1920 |